United States Patent [19]

Stier

[11] Patent Number: 5,277,346
[45] Date of Patent: Jan. 11, 1994

[54] CLAMPING DEVICE

[76] Inventor: Paul Stier, P.O. Box 39, Dana Point, Calif. 92629

[21] Appl. No.: 852,985

[22] Filed: Mar. 16, 1992

[51] Int. Cl.$^5$ ............................................ B60R 9/048
[52] U.S. Cl. ...................... 224/42.45 R; 224/42.03 B; 248/316.2
[58] Field of Search ............ 224/42.03 R, A, B, 42.38, 42.42, 224/42.45 R; 269/228, 269/77, 78; 294/104; 211/17; 248/316.1, 316.2, 316.5, 74.1; 400/24, 87; 24/336, 265

[56] References Cited

U.S. PATENT DOCUMENTS

| | | | |
|---|---|---|---|
| 902,570 | 11/1908 | Ellis | 294/104 |
| 2,731,696 | 1/1956 | Sutton | 248/316.2 |
| 4,437,599 | 3/1984 | Jordening | 224/42.03 B X |
| 4,688,706 | 8/1987 | Thulin | 224/322 X |
| 4,877,169 | 10/1989 | Grim | 224/331 |
| 4,934,572 | 6/1990 | Bowman et al. | 211/17 X |
| 5,121,862 | 6/1992 | Schmidt | 224/42.03 B |

Primary Examiner—Henry J. Recla
Assistant Examiner—Glenn T. Barrett
Attorney, Agent, or Firm—J. E. Brunton

[57] ABSTRACT

An article transport apparatus which can be interconnected with vehicle trailer hitches of a standard design, the apparatus includes one or more clamping devices that are specially designed for clamping tubing of various diameter such as found on bicycles, wheelchairs and like articles. The clamping devices include cooperating clamping jaws which, once closed, are automatically locked in the closed position about the tubing.

14 Claims, 3 Drawing Sheets

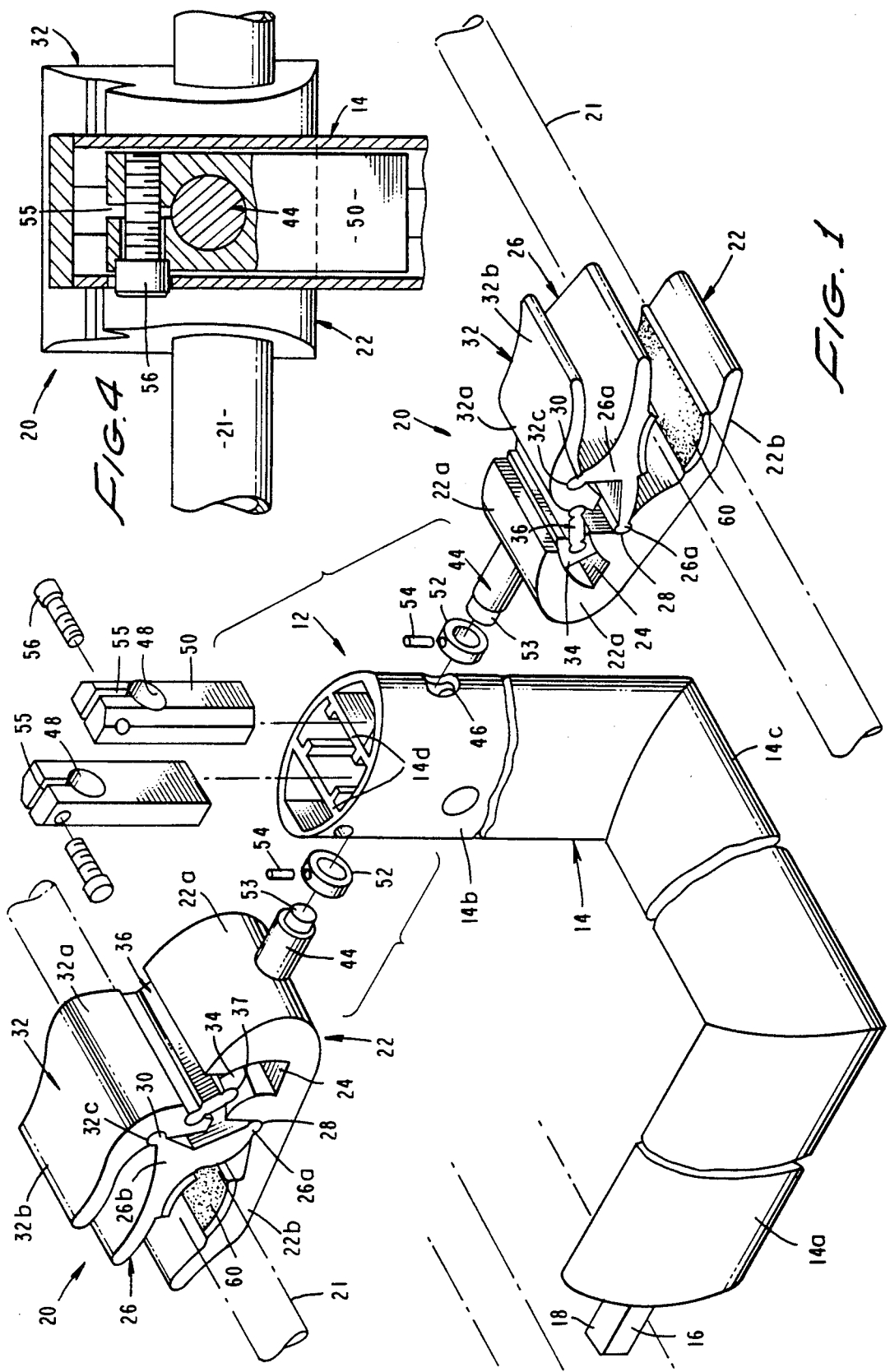

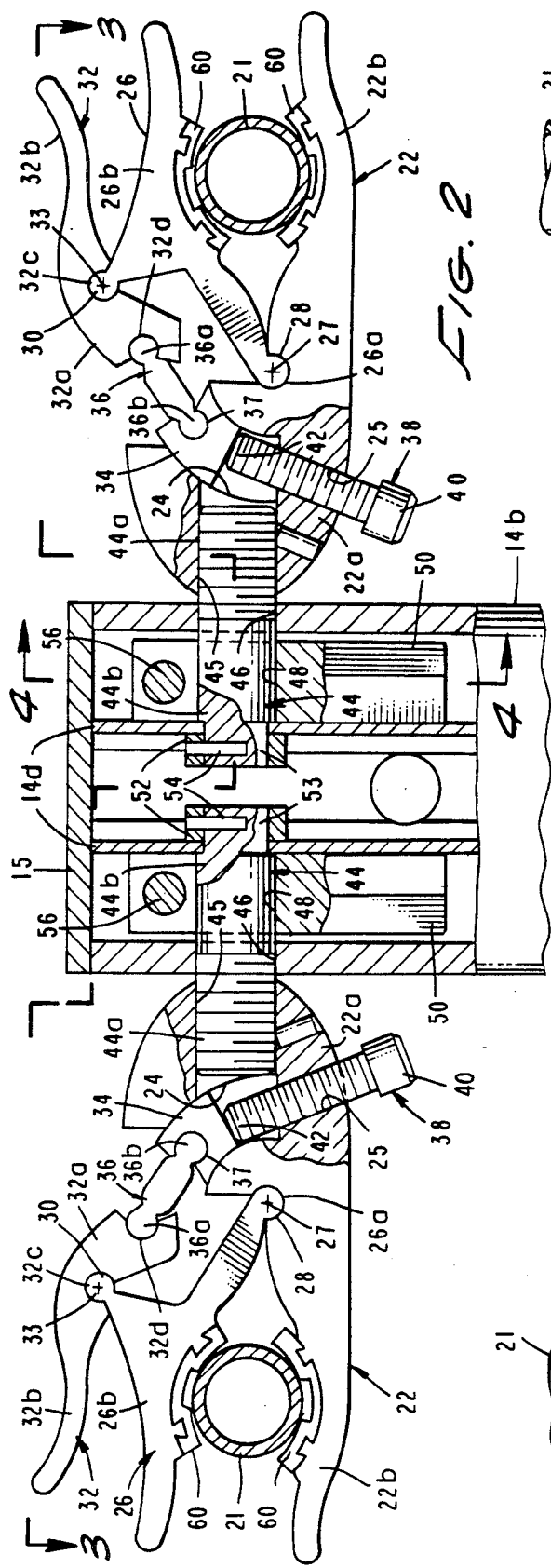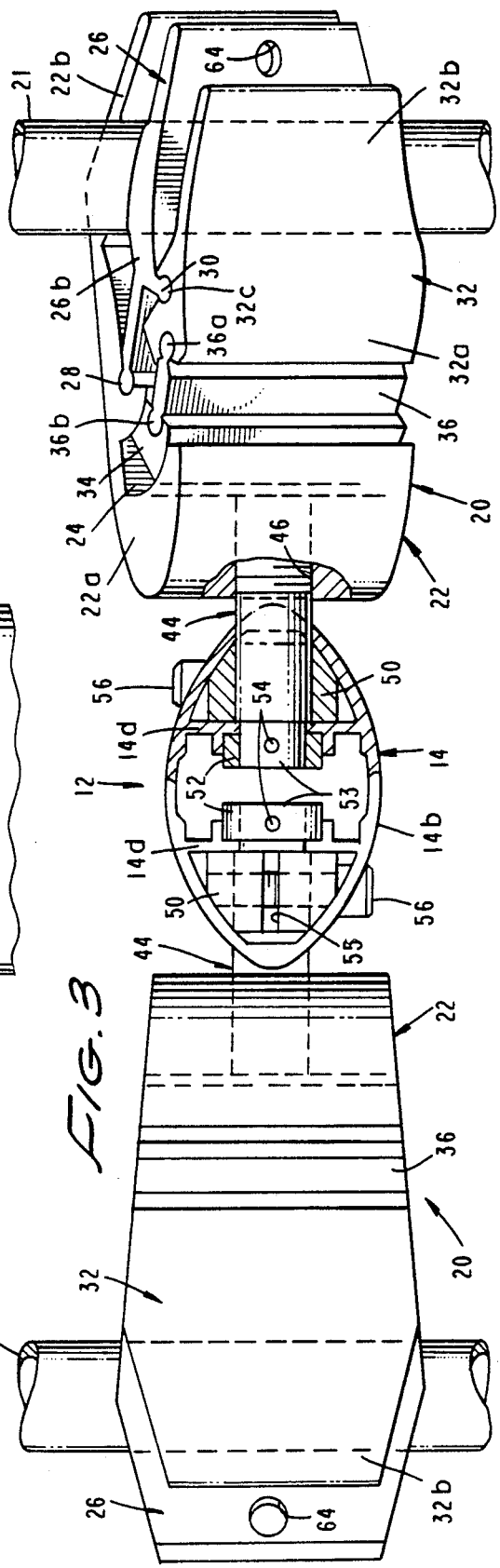

CLAMPING DEVICE

BACKGROUND OF THE INVENTION

1. Field of the Invention

The present invention relates generally to clamping devices. More particularly, the invention concerns a clamping device for use in connection with a connector assembly for mounting articles such as bicycles, wheelchairs and the like onto vehicles for safe transportation.

2. Discussion of the Invention

A number of different types of clamping devices for clamping structural members of articles such as bicycles and wheelchairs have been devised in the past. Many of these devices embody a number of separate component parts and are sometimes quite difficult to operate. Also many of the prior art devices are not well suited for use with a connector assembly adapted to be interconnected with transporting vehicles such an automobile or truck.

Applicant is aware of the following prior art patents which disclose various types of clamping devices: U.S. Pat. No. 2,553,802 issued to Woods; U.S. Pat. No. 3,150,895 issued to Lebre; and U.S. Pat. No. 3,346,929 issued to Webb.

Several kinds of apparatus embodying clamping devices have also been suggested for carrying articles such as bicycles, wheelchairs, and the like at the rear of passenger vehicles and trucks. In many instances, these prior art devices include a connector assembly which is detachably connected to the rear bumper of the vehicle by some type of interconnecting means. An article clamping subassembly is typically affixed to the connector assembly to clamp onto the article to be transported. Both the interconnecting means and the article clamping subassembly typically embody mechanical fasteners, such as nuts, bolts, washers and the like and various hand tools are required to connect and disconnect the apparatus to the vehicle and to connect the article to the clamping subassembly. Such devices are often cumbersome and inconvenient to use because they require that a number of different tools be carried in the vehicle at all times to accomplish the interconnection to the carrier structure with the vehicle bumper and to clamp the article within the clamping subassembly. Additionally, such devices are usually easily removable by persons intending to steal either the carrier assembly itself or the carrier assembly along with the article being carried thereby.

Exemplary of prior art bicycle carriers which are removably interconnected with the bumpers of automobiles or trucks are those devices illustrated and described in U.S. Pat. No. 3,877,622 issued to McLain and U.S. Pat. No. 4,299,341 issued to Copelind et al. The patent to Jordening, No. 4,437,599 discloses a prior art device for carrying bicycles or wheelchairs. However, the thrust of the latter identified patent is directed toward adaptation of an existing bicycle carrier to facilitate the carrying of a wheelchair.

The apparatus of the present invention overcomes the drawbacks of the prior art devices by providing an apparatus which includes a connector assembly that is easily connected to the trailer hitch of a vehicle and a unique clamping device which is interconnected with a support member that comprises a part of the connector assembly. The clamping device is of a highly novel construction, is easy to operate and functions to positively and securely clamp onto a tubular member of the article to be transported such as the cross bar of a bicycle.

SUMMARY OF THE INVENTION

It is an object of the present invention to provide an article transport apparatus which includes a clamping device particularly suited for clamping tubing of various diameter such as is used in bicycle frames.

Another object of the invention is to provide an apparatus of the aforementioned character which has a minimum number of parts, is of simple design and one which is easy to manufacture and use.

A particular object of the invention is to provide a clamping device that can conveniently be used with a transport assembly that can be connected to a standard trailer hitch receiver of the character often found on automobiles and trucks.

Another object of the invention is to provide a clamping device of the character described in the preceding paragraph which can securely hold articles such as bicycles, wheelchairs, wheeled carts and the like for safe transport on motor vehicles such as automobiles and trucks.

Another object of the invention is to provide a clamping device of the character described which includes cooperating clamping jaws which, once closed, are automatically locked in the closed position.

Still another object of the invention is to provide a clamping device as described in the preceding paragraph which can be secured in the locked position by means of a padlock.

Another object of the invention is to provide a clamping device of the class described which is very compact so that two or more devices can be conveniently connected to the support member of the connector assembly so that two or more bicycles can be carried on a single connector assembly.

Yet another object of the invention is to provide a clamping device of the character described in the preceding paragraph device of the character described in the preceding paragraph which can be rotatably mounted on the support member so that the clamping device can be rotated into various orientations relative to the connector assembly.

BRIEF DESCRIPTION OF THE DRAWINGS

FIG. 1 is a generally perspective, exploded view of one form of the apparatus of the present invention.

FIG. 2 is a fragmentary, side elevational view of the upper portion of the apparatus of the invention partly broken away to show internal construction.

FIG. 3 is a view taken along lines 3—3 of FIG. 2

FIG. 4 is a view taken along lines 4—4 of FIG. 2.

DESCRIPTION OF THE INVENTION

Figure 5:
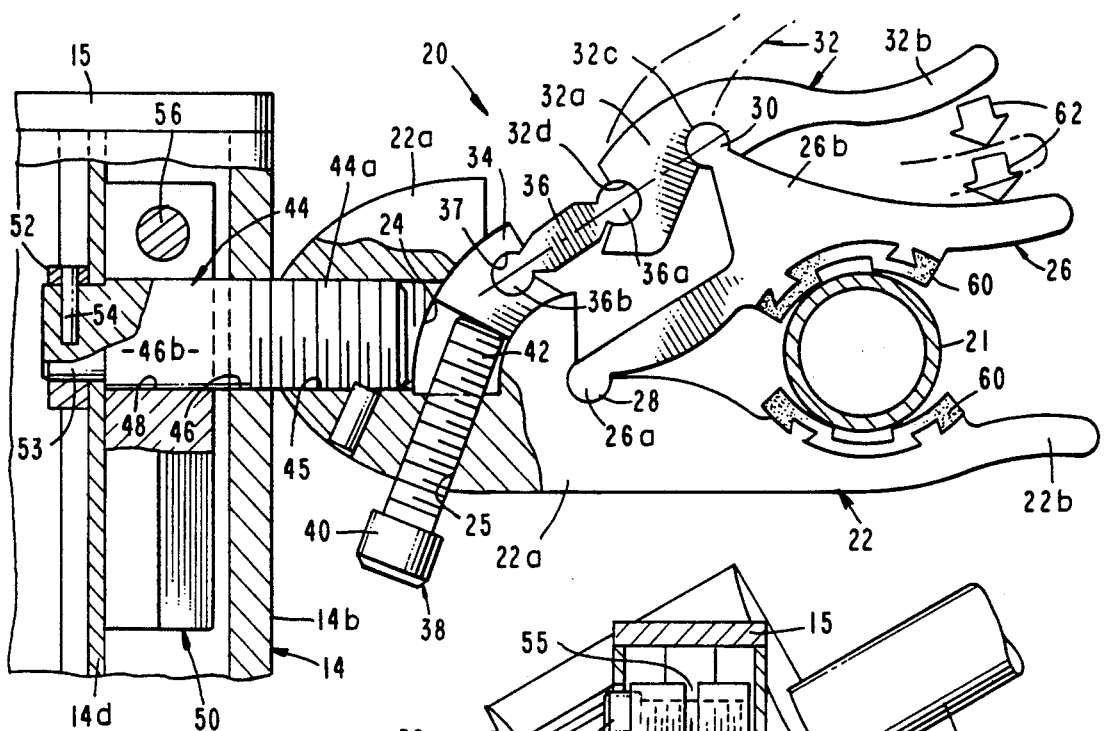
FIG. 5 is a fragmentary, side elevational view of the apparatus partly broken away to show internal construction and illustrating the clamping device of the apparatus in an open position.

Referring to the drawings and particularly to FIGS. 1, 2 and 3, the apparatus of the present invention for mounting articles such as bicycles, wheelchairs and the like to a trailer hitch of a vehicle is generally designated by the numeral 12. In the form of the invention shown in the drawings, the apparatus comprises a support 14, means for connecting the support to the trailer hitch of the vehicle and a pair of clamping devices 20 which are connected to the upper portion of the support. The means for connecting the support to the trailer hitch is here shown as an outwardly extending member 16 which is telescopically receivable within the square channel receiver portion 18 of a standard trailer hitch.

As best seen in FIG. 1, the support 14 of the apparatus comprises a ridged structure which is generally elliptical in cross-section and includes a lower generally horizontally extending section 14a, an upper, generally vertically extending section 14b and an intermediate angularly upwardly extending section 14c. Upper section 14b is preferably closed by an elliptical shaped cap 15. Support 14 also includes spaced-apart, internal webbing 14d, the purpose of which will presently be described.

Comprising an important and highly novel feature of the apparatus of the present invention is the previously identified clamping device 20 which is adapted to releasably grip structural members such as tubing 21. As best seen by referring to FIGS. 1 and 2, the clamping device of this embodiment of the invention comprises a base 22 having a rear body portion 22a and an integrally formed, forwardly extending first gripping arm portion 22b. Rear body portion 22a is provided with a transversely extending generally arcuate shaped groove 24, the purpose of which will presently be understood.

A second gripping arm 26 is pivotally connected to base 22 for pivotal movement about a transversely extending pivot axis identified in FIG. 2 by the numeral 27. More particularly, provided proximate one extremity of arm 26 is a transversely extending, semi-cylindrically shaped end portion 26a which is rotatably received within a transverse groove 28 formed in arm 22. Gripping arm 26 is also provided with an outwardly protruding center portion 26b which terminates in a transversely, semi-cylindrically shaped portion 30. Arms 22b and 26 comprise the gripping jaws of the apparatus for gripping the article to be transported.

Pivotally connected to second arm 26 is an actuating arm 32 which comprises a rear body portion 32a and a forwardly extending arm portion 32b. Actuating arm 32 is provided with a generally centrally located transversely extending groove 32c which is constructed so as to closely receive semi-cylindrically shaped portion 30 of second gripping arm 26. A second transversely extending groove 32d is provided in the rear body portion 32a of actuating arm 32. With the construction thus described, actuating arm 32 is pivotally movable relative to gripping arm 26 about a transverse axis generally designated in FIG. 2 by the numeral 33.

As best seen in FIG. 2, linkage means is provided for operably interconnecting actuating arm 32 with base 22. In the present form of the invention, the linkage means comprises a guide member 34 which is slidably movable within arcuate groove 24 of base 22 and a linkage element 36 which pivotally interconnects guide member 34 with actuating arm 32. Linkage element 36 includes at each end thereof a transversely extending semi-cylindrical shaped portion designated in the drawings by the numerals 36a and 36b respectively. Portion 36a is closely receivable within groove 32d provided in actuating arm 32 while portion 36b, is closely receivably within a transversely extending groove 37 provided in guide member 34. With this construction, as actuating arm 32 is pivotally moved about pivotal axis 33, end portion 32a of the linkage element will rotate within the groove 32d provided in the actuating arm. In similar fashion, end portion 32b will pivotally move, or rotate, within groove 37 provided in guide member 34.

Also forming a part of the linkage means of the present form the apparatus of the invention, is adjustment means for selectively positioning guide member 34 within groove 24. This adjustment means is here shown as externally threaded bolt 38 which is threadably receivable within a threaded bore 25 provided in body portion 22a of base 22. Bolt 38 includes a head portion 40 which can be engaged by an appropriate tool, such as a wrench and an inner-end portion 42 which is normally in engagement with the inner surface of guide member 34. With this arrangement, as bolt 38 is threaded inwardly and outwardly of base 22, guide member 34 will be controllably moved within groove 24. The purpose for positioning guide member 34 at various locations within groove 24 will be discussed hereinafter.

As best seen in FIG. 2, interconnection means are provided to adjustably interconnect the clamping devices 20 with the support 14. In the instant embodiment of the invention, these means comprise generally cylindrically shaped connector members 44, each of which has a threaded shank portion 44a which is threadably received within a threaded bore 45 provided in body portion 22a of base 22. (See FIG. 2). The outboard end portion 44b of each of the cylindrical members 44 extends through an aperture 46 provided in section 14b of support 14 (FIGS. 1 and 2). Each of the cylindrical members 44 also extends through an aperture 48 provided in a clamping block 50 which is slidably receivable within upper portion 14b of support 14. As best seen in FIG. 3, blocks 50 are slidably received internally of section 14b between webbing 14 and the inner walls of the support member. An annular ring 52 is receivable over a reduced diameter portion 53 of the outboard end of cylindrical members 44 after the free end portions have been inserted through clamping blocks 50. Rings 52 are interconnected with cylindrical members 44 by locking pins 54 which are receivable within drilled holes provided in ring 52 and in the reduced diameter portions 53 of cylindrical members 44. It is apparent that with ring 52 pinned to cylindrical member 44 in the manner shown in FIG. 2, the clamping device cannot be withdrawn from support 14 without first removing rings 52. It is also apparent that the clamping devices are, at least initially, freely rotatable about their longitudinal axes with respect to support 14 thus permitting each clamping device to be oriented at various selected angles with respect to support member 14 (see for example FIG. 3).

Figure 7:
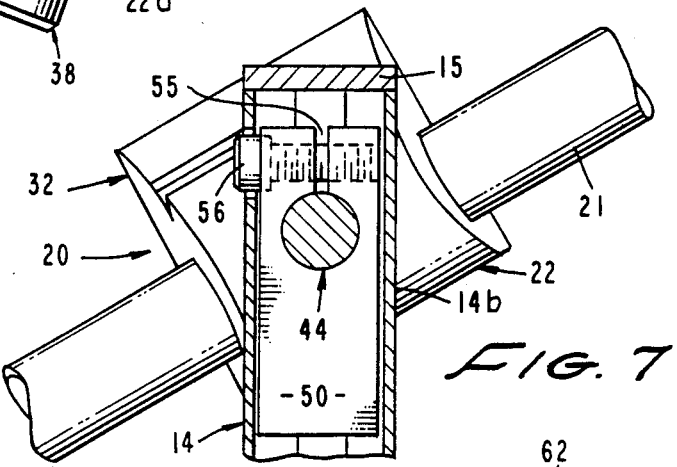
FIG. 7 is a fragmentary end view of one of the clamping devices of the apparatus of the invention illustrating the rotatability of the clamping device relative to the support member.

Turning again to FIG. 1, it is to be noted that each of the clamping blocks 50 is provided with a slot 55 proximate its upper end and is internally threaded to receive a transversely extending, threaded bolt 56. Bolts 56 function to permit the upper end of each member 50 to be moved in and out of clamping relationship with the cylindrical member 44 which extends through the aperture 48 provided in each member 50. With this construction, by tightening bolts 56, the clamping devices can be securely clamped into any desired orientation with respect to support 14 (FIG. 7). For example, as can be seen by referring to FIG. 3, if desired each of the clamping devices can be secured at a different angular orientation with respect to portion 14b of support 14. This feature greatly facilitates the attachment to support 14 of various configured articles such as bicycles, wheelchairs and the like for vehicle transport from place to place.

Figure 6:
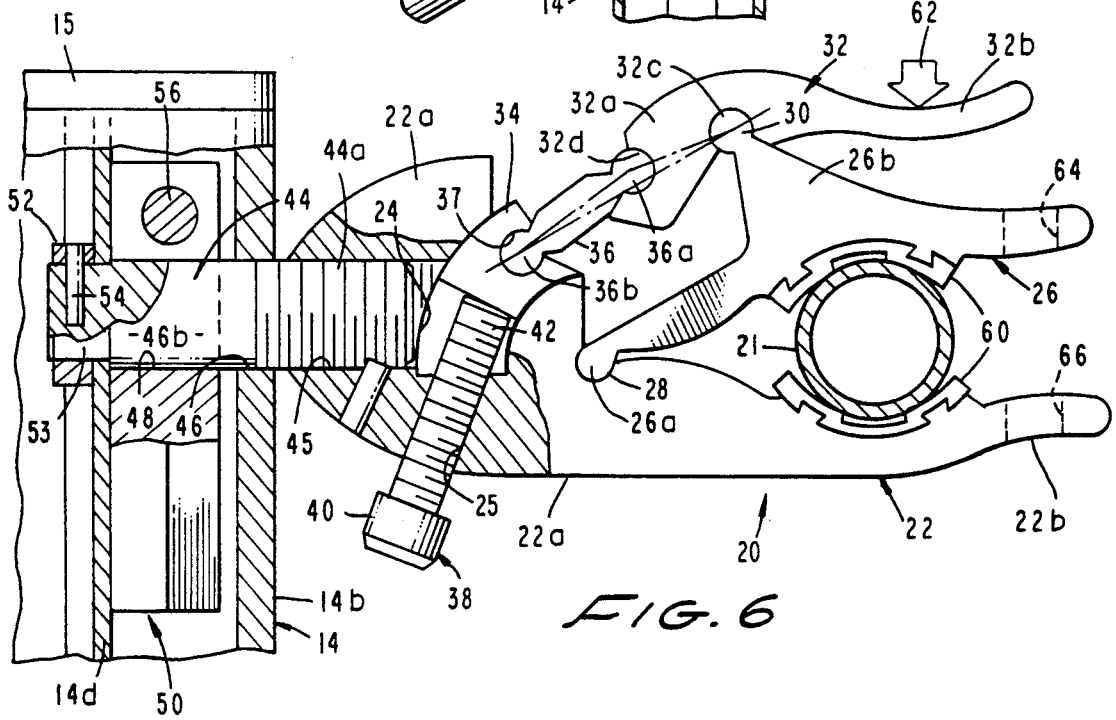
FIG. 6 is a fragmentary, side elevational view similar to FIG. 5 but showing the clamping device in an article-clamping configuration.

Referring particularly to FIGS. 5 and 6, it can be seen that the gripping jaw portion of each of the arms 22b and 26 is provided with a resiliently deformable gripping element 60 which is adapted to securely engage the tubular member 21. Elements 60 can be constructed of any suitable material such as a soft rubber or plastic which will securely grip the tubular members but will not mar the surfaces thereof.

In using the apparatus of the invention, the clamping devices are first positioned in the desired orientation with respect to the upper portion of support 14b. This is accomplished by loosening bolt 56, then rotating the clamping device to the desired position and finally tightening bolt 56 to move the upper split end of clamping block 50 into clamping engagement with connector member 44. This done, bolt 38 is rotated to move slide member 44 into the desired position within groove 24 so that, when the clamping device is closed about the tubular member, it will automatically lock into position so as to securely gripping the tubular member. It is to be observed that by rotating bolt 38 in a counter-clockwise rotation (assuming right-handed threads) block 34 will be permitted to slide downwardly within groove 24. This downward movement of slide block 34 will permit tubular articles having a larger diameter than that of tubular member 21 to be securely gripped upon moving the actuating arm 32 into the closed position. In the preferred form of the invention, when guide member 34 is positioned at the bottom of groove 24 by rotating bolt 38 to its maximum outward position, members having a diameter of about two inches can be securely clamped within the clamping device. Conversely, when bolt 38 is threaded inwardly relative to base 22 so as to move guide member 34 upwardly within groove 24 to its maximum extent, the clamping device can be used to clamp tubing of about three-quarters of an inch in diameter. However, it is to be understood that thee ranges are given only by way of example. By constructing the clamping devices larger or smaller, other clamping ranges can be readily achieved.

After the clamping device has been initially adjusted in the manner described, actuating arm 32b is moved upwardly to the position shown in the solid lines in FIG. 5 and the tubular member to be clamped is inserted between gripping jaws in the manner illustrated in FIG. 5. Downward movement on actuating arm 32b in the direction indicated by the arrows 62 will cause the gripping arms to move into clamping engagement with the tubular member in the manner shown in FIG. 6. Because of the unique design of the linkage means of the apparatus, when the guide member has been properly positioned within groove 24 actuating arm 32 will move into an "overcenter" position thereby automatically locking arms 22b and 26 in secure engagement with tubular member. In this overcenter position, a reasonably substantial force must be exerted on actuating arm 32 in a direction opposite that shown by arrows 62 in order to permit arms 26 and 22b to once again move into the open configuration shown in FIG. 5.

Referring to FIG. 6 it is to be noted that drilled holes 64 and 66 are provided near the extremities of arms 26 and 22b respectively. Drilled holes 64 and 66 are of a size to accommodate a small cable, a chain or a padlock adapted to prevent movement of arms 26 and 22b into an open position. In this way, both accidental and unauthorized opening of the clamping device is prevented thereby guarding against inadvertent removal of the article being carried from the apparatus of the invention.

Having now described the invention in detail in accordance with the requirements of the patent statutes, those skilled in this art will have no difficulty in making changes and modifications in the individual parts or the relative assembly in order to meet specific requirements or conditions. Such changes and modifications may be made without departing from the scope and spirit of the invention, as set forth in the following claims.

I claim:

1. A clamping device for interconnection with a support comprising:
   (a) a base having a body portion and a forwardly extending first gripping arm portion, said body portion having a groove;
   (b) a second gripping arm pivotally connected to said base for pivotal movement between first and second positions;
   (c) an actuating arm pivotally connected to said second gripping arm for pivotal movement between a release position and a locking position;
   (d) linkage means for operably interconnecting said actuating arm with said base, said linkage means comprising a linkage element having first and second ends, said first end being disposed within said groove and said second end being in engagement with said actuating arm; and
   (e) means for connecting said base to the support.

2. A clamping device as defined in claim 1 in which said first and second gripping arm portions each include article gripping jaws.

3. A clamping device as defined in claim 1 in which said linkage means comprises a guide member slidably movable within said groove in said body portion of said base, said linkage element being pivotally interconnected with said actuating arm.

4. A clamping device as defined in claim 3 further including adjustment means for positioning said guide member within said groove.

5. A clamping device as defined in claim 4 in which said adjustment means comprises a threaded member having a threaded portion threadably connected to said base and extending into said groove for engagement with said guide member.

6. A clamping device as defined in claim 5 in which said means for connecting said base to the support comprises a connector affixed to said base and extending outwardly therefrom.

7. An apparatus for mounting articles at a rear of a vehicle comprising:
   (a) a support;
   (b) means for connecting said support to the vehicle;
   (c) a clamping device connected to said support, said clamping device comprising:
      (i) a base having a body portion and a forwardly extending first gripping arm portion, said body portion having a transversely extending groove;

(ii) a second gripping arm pivotally connected to said base for pivotal movement between first and second positions;

(iii) an actuating arm pivotally connected to said second gripping arm for pivotal movement between a release position and a locking position; and (iv) linkage means for operably interconnecting sad actuating arm with said base, said linkage means comprising a linkage element having first and second ends, said first end being disposed within said groove and said second end being in engagement with said actuating arm.

8. An apparatus as defined in claim 7 in which said first and second gripping arm portions of said clamping device each include gripping elements for gripping said articles, said gripping elements grippably engaging said article upon pivotal movement of said second gripping arm from said first position to said second position.

9. A clamping device as defined in claim 7 in which said linkage means comprises a guide member slidably movable within said groove in said body portion of said base, said linkage element being pivotally connected to said actuating arm.

10. An apparatus as defined in claim 9 in which said means for connecting said support to said vehicle comprises an interconnecting member connected to said support said interconnecting member being receivable within a square tube trailer hitch.

11. An apparatus for mounting articles on a vehicle comprising:

(a) a support;

(b) means for connecting said support to the vehicle;

(c) a clamping device connected to said support, said clamping device comprising:

(i) a base having a body portion and a forwardly extending first gripping arm portion, said body portion having a groove;

(ii) a second gripping arm pivotally connected to said base for pivotal movement between first and second positions;

(iii) an actuating arm pivotally connected to said second gripping arm for pivotal movement between a release position and a locking position; and (iv) linkage means for operably interconnecting sad actuating arm with said base, said linkage means comprising:

a. a guide member slidably movable within said groove in said body portion of said base; and b. a linkage element pivotally interconnecting said guide member and said actuating arm; and (v) adjustment means for positioning said guide member within said groove.

12. An apparatus as defined in claim 11 in which said adjustment means comprises an adjusting member threadably connected to said base and extending into said groove for engagement with said guide member.

13. An apparatus as defined in claim 12 in which said support comprises an upper portion, a lower portion and an angularly downwardly extending central portion interconnecting said upper and lower portions.

14. An apparatus as defined in claim 13 in which said clamping device is rotatably connected to said upper portion of said support for rotation with respect thereto.

* * * * *